(12) United States Patent
Kent

(10) Patent No.: US 9,228,874 B2
(45) Date of Patent: Jan. 5, 2016

(54) MEASURING CUP

(71) Applicant: Progressive International Corporation, Kent, WA (US)

(72) Inventor: Joseph Kent, Seattle, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 0 days.

(21) Appl. No.: 14/607,706

(22) Filed: Jan. 28, 2015

(65) Prior Publication Data

US 2015/0211908 A1     Jul. 30, 2015

Related U.S. Application Data

(60) Provisional application No. 61/933,610, filed on Jan. 30, 2014.

(51) Int. Cl.
*G01F 19/00* (2006.01)
(52) U.S. Cl.
CPC ...................... *G01F 19/00* (2013.01)
(58) Field of Classification Search
CPC ........................................ G06F 19/00
USPC .................................... 73/426, 427
See application file for complete search history.

(56) References Cited

U.S. PATENT DOCUMENTS

| 423,018 | A | 3/1890 | Young | |
|---|---|---|---|---|
| 5,397,036 | A * | 3/1995 | Maiwald | 222/475 |
| D437,793 | S | 2/2001 | Kaposi et al. | |
| D450,605 | S | 11/2001 | Wright | |
| D518,392 | S | 4/2006 | Kaposi | |
| D530,632 | S | 10/2006 | Kaposi | |
| D544,378 | S | 6/2007 | Curtin | |
| 7,306,120 | B2 | 12/2007 | Hughes | |
| D580,799 | S | 11/2008 | Curtin | |
| D588,947 | S | 3/2009 | Curtin | |
| 7,503,212 | B2 * | 3/2009 | Dalla Piazza et al. | 73/429 |
| D673,812 | S | 1/2013 | Hauser | |
| 2007/0089507 | A1 * | 4/2007 | Rubalsky et al. | 73/426 |
| 2009/0193890 | A1 * | 8/2009 | Mentesh | 73/427 |
| 2010/0011855 | A1 * | 1/2010 | Yip | 73/426 |
| 2013/0150783 | A1 * | 6/2013 | Pamboukis | 604/78 |

* cited by examiner

*Primary Examiner* — Lisa Caputo
*Assistant Examiner* — Jamel Williams
(74) *Attorney, Agent, or Firm* — Lowe Graham Jones PLLC

(57) ABSTRACT

A measuring cup includes a floor and sidewalls to define an internal volume. The floor is inclined to enable increasing volumes from a lowest point on the floor to the highest point on the floor. A first set of volumetric markings is positioned on the floor for measuring small volumes, and a second set of volumetric markings is positioned on the sidewall for measuring relatively larger volumes.

15 Claims, 5 Drawing Sheets

MEASURING CUP

PRIORITY CLAIM

This application claims the benefit of prior U.S. Provisional Application Ser. No. 61/933,610 filed Jan. 30, 2014; the contents of which are hereby incorporated by reference.

FIELD OF THE INVENTION

This invention is generally related to measuring cups.

BACKGROUND OF THE INVENTION

Standard measuring cups are configured to measure relatively large volumes of liquids, for example including increments of fractions or multiples of a cup. In order to measure smaller volumes, one must use different measuring devices such as measuring spoons having volumes that are typically in increments of fractions or multiples of teaspoons or tablespoons. This requires the use of many different measuring cups and spoons in order to facilitate the measurement of both large and small volumes.

SUMMARY OF THE INVENTION

In accordance with preferred versions of the invention, a measuring cup includes volumetric markings positioned on vertical sidewalls to indicate measurements for relatively large volumes. In one version, the large volume measurements are in fractions or multiples of 1 cup.

The preferred measuring cup also includes a floor having one end that is lower than the opposite end, and which in one example of the invention is inclined continuously from a first lowest end to a second highest end. In one example of the invention, the floor of the measuring cup is lowest beneath the spout and highest at a diametrically opposite location adjacent a handle. In some versions, no handle is included.

A second set of volumetric measurements is provided on the floor itself with the second set of volumetric measurements being in fractions or multiples of teaspoons or tablespoons. The volumetric measurements located on the floor are in increments that are preferably much smaller than those on the sidewall. In one preferred version, the largest measurement on the floor of the measuring cup is smaller than, or equal to, the smallest initial measurement located on the sidewall of the measuring cup.

Accordingly, a single measuring cup in accordance with the preferred embodiment is able to measure increments of both relatively large volumes and relatively small volumes.

BRIEF DESCRIPTION OF THE DRAWINGS

Preferred and alternative examples of the present invention are described in detail below with reference to the following drawings:

FIG. 4 further includes representative volumetric markings on the sidewall of the cup.

DETAILED DESCRIPTION OF THE PREFERRED EMBODIMENT

Figure 4:
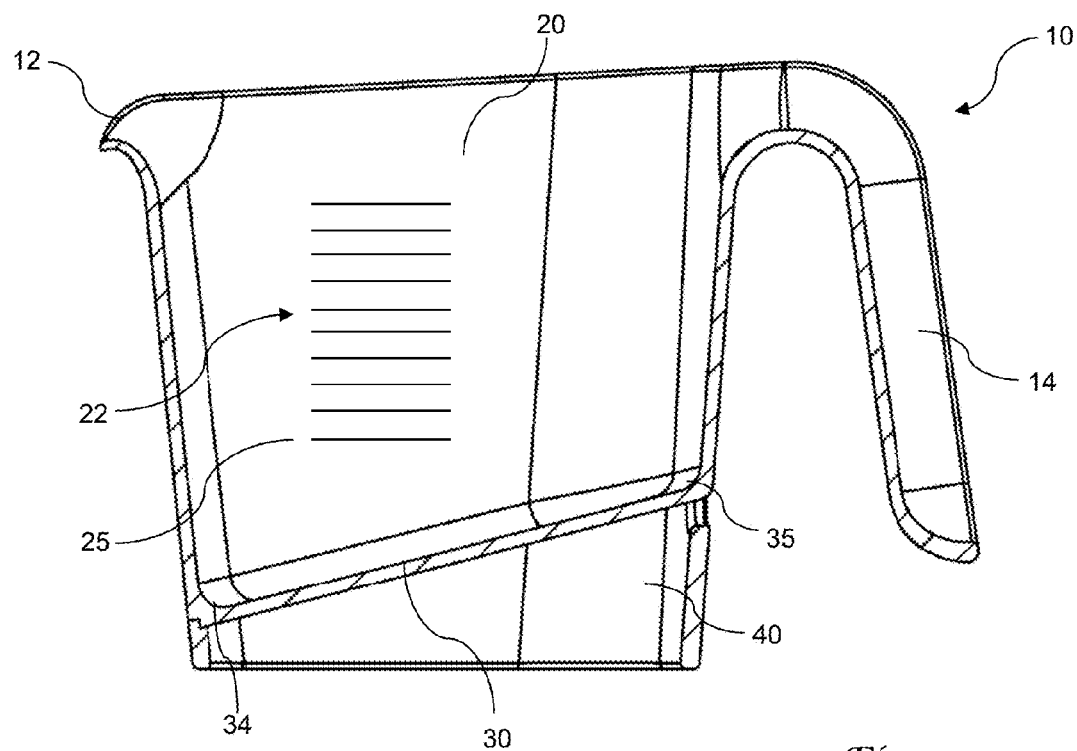
FIG. 4 is a sectional view of the measuring cup of FIG. 1, taken along plane A-A as illustrated in FIG. 3.
Figure 5:
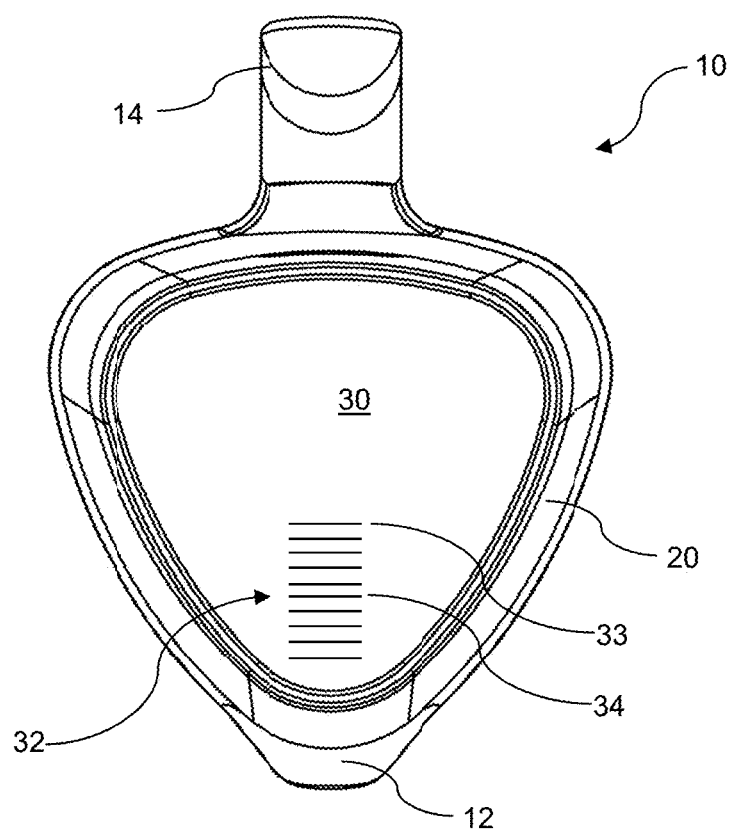
FIG. 5 is a top view of the measuring cup of FIG. 1, showing volumetric markings on the floor of the measuring cup.
Figure 6:
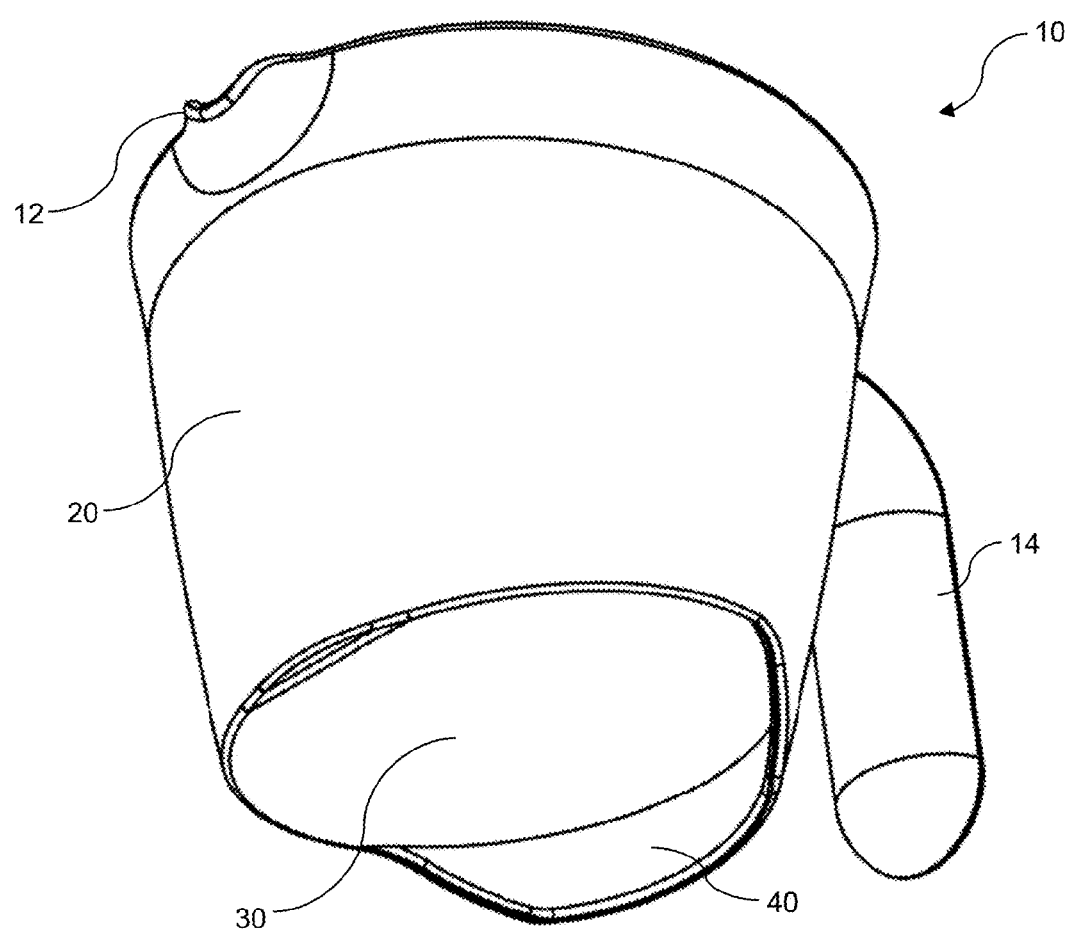
FIG. 6 is a bottom perspective view of an alternate version of a preferred measuring cup, shown without volumetric markings.
Figure 7:
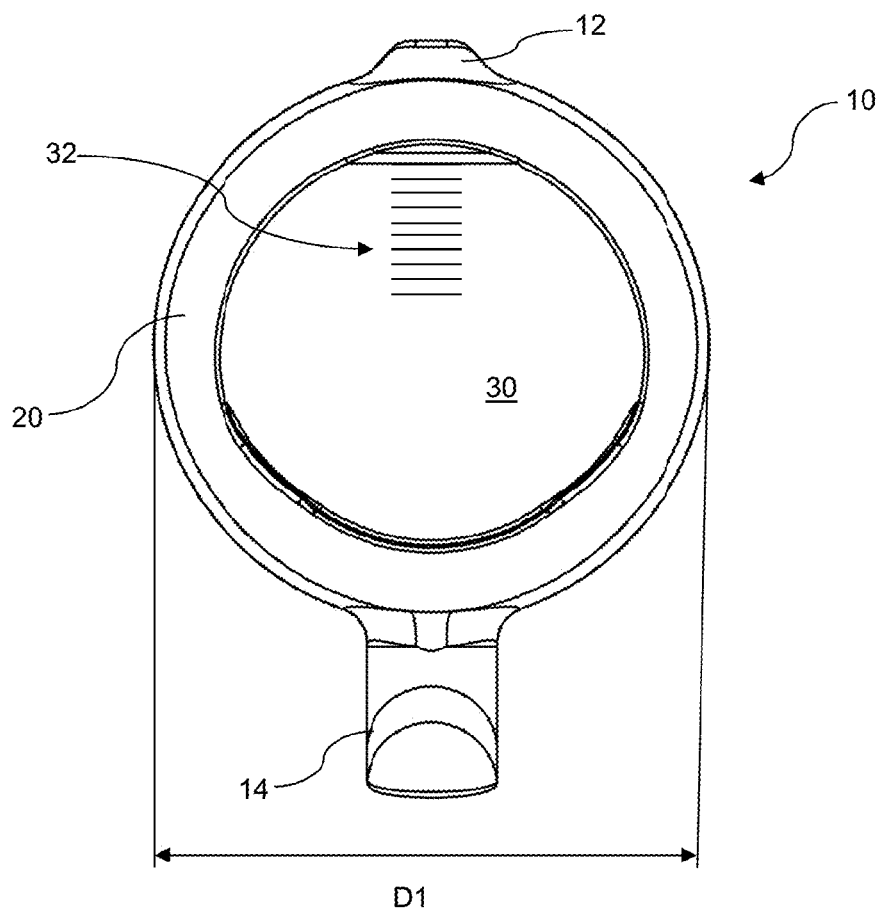
FIG. 7 is a top view of the measuring cup of FIG. 6, showing volumetric markings on the floor of the measuring cup.
Figure 8:
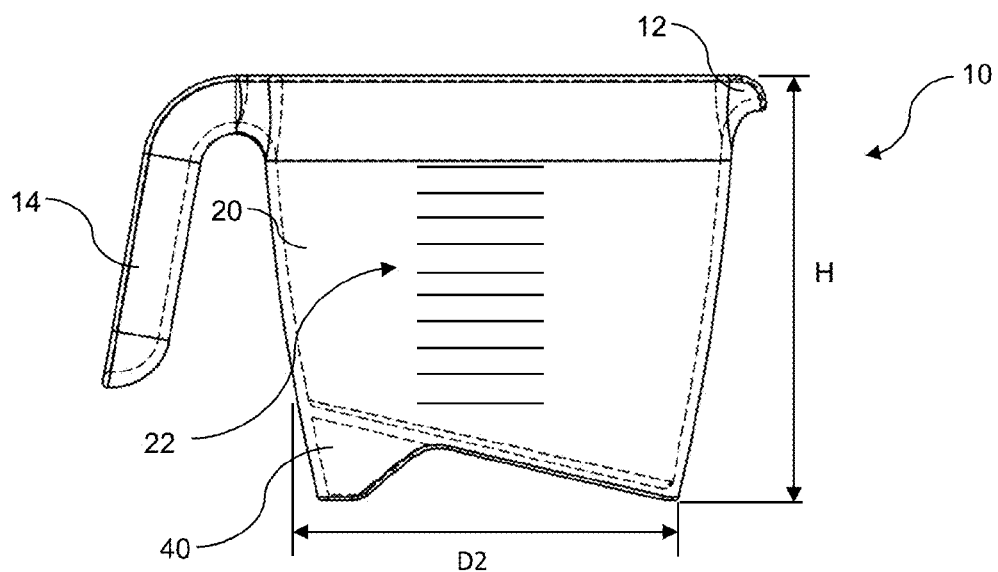
FIG. 8 is a side view of the measuring cup of FIG. 6, show with representative volumetric markings on the sidewall of the cup.

A preferred measuring cup 10 is shown in the accompanying figures, including a first version illustrated in FIGS. 1-5 and a second version illustrated in FIGS. 6-8. In each case the measuring cup includes common features of two different sets of volumetric markings, one of which is placed on an inclined surface on the floor of the measuring cup. The two differ in the shape of the floor and sidewalls, as well as in the shape of the base for supporting the inclined floor of the cup.

Figure 1:
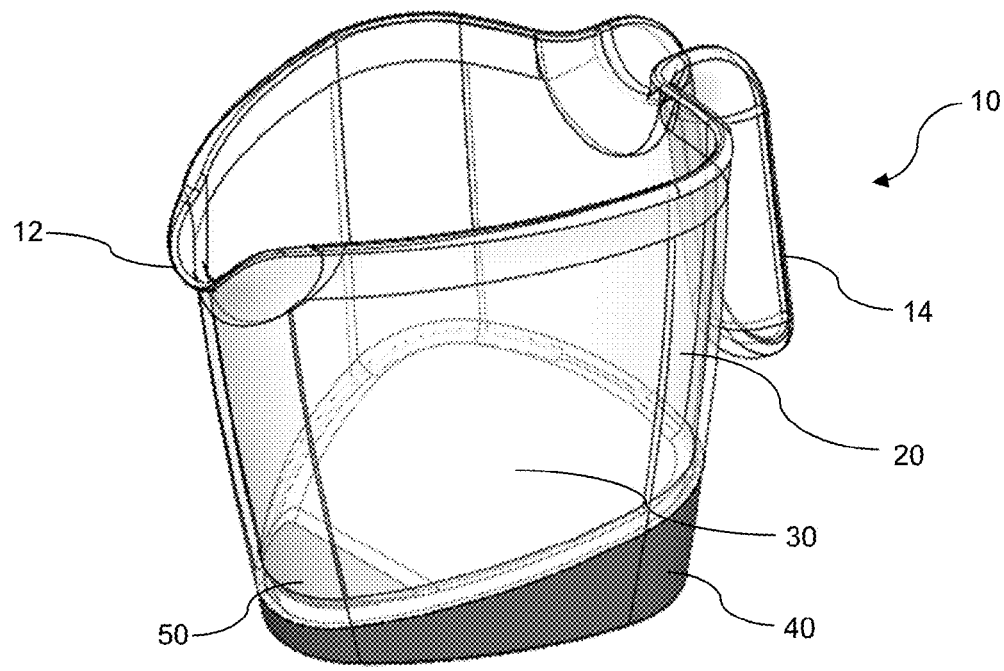
FIG. 1 is a perspective view of a preferred measuring cup, illustrated without the accompanying volumetric markings for clarity of illustration of the component parts.
Figure 2:
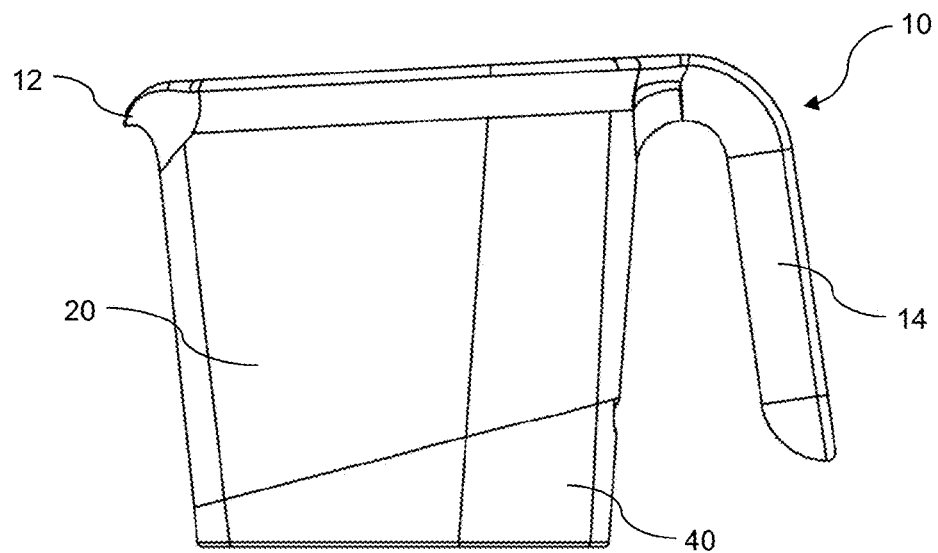
FIG. 2 is a front view of the measuring cup of FIG. 1.
Figure 3:
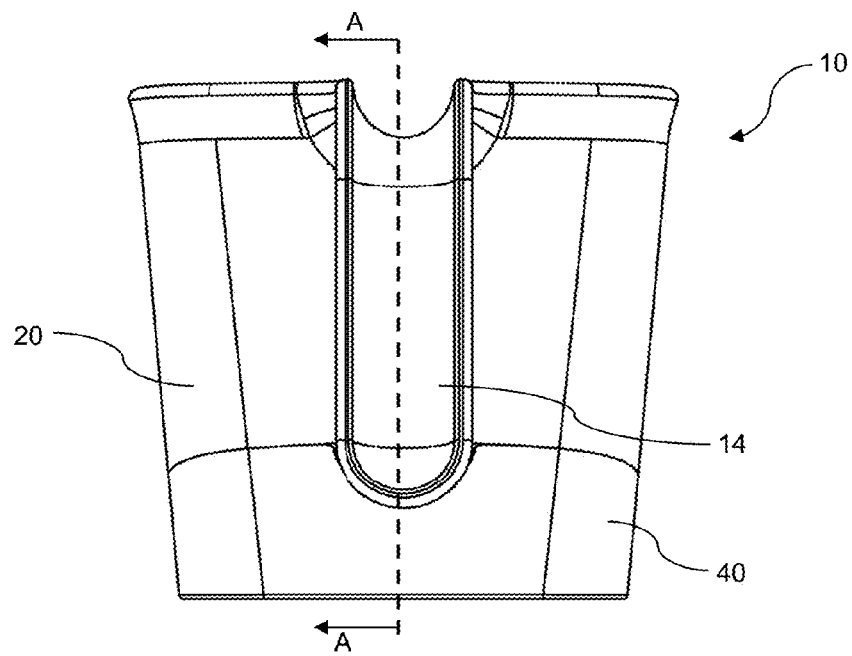
FIG. 3 is a right side view of the measuring cup of FIG. 1, shown with section plane A-A.

With reference to the cup 10 of FIG. 1, the illustrated version includes a handle 14 and a spout 12. The handle and spout are optional features which may be omitted from other versions of the invention. The measuring cup includes a floor 30 surrounded by upwardly extending sidewalls 20 in which the floor and sidewalls are joined together to form an interior space. In the illustrated version, the floor is supported by a foundation or base 40 to provide an upright support for the measuring cup when resting on a horizontal surface.

In the illustrated version, the handle 14 is positioned at a first side of the cup while the spout 12 is positioned at a diametrically opposite location on the cup. In other versions, the measuring cup may not include a handle or spout, or alternatively, the spout may be located in a different position with respect to the handle.

In the illustrated version, and as best seen in the sectional view of FIG. 4, the floor is inclined from a lowest position 34 directly beneath the spout and is angled upwardly continuously to a highest position 35 directly opposite the spout and adjacent the handle. This configuration allows a small volume of liquid 50 (shown in FIG. 1) to collect at the lowest portion of the floor adjacent the sidewall extending upwardly from the lowest portion of the floor.

As best seen in FIG. 4, a first set of volumetric markings 22 is positioned on a sidewall of the container 20, with the first set of volumetric markings being configured to indicate corresponding volumes within the container between the floor and a corresponding position on the sidewall of the measuring cup aligned with markings positioned on the sidewall. In one version, the first set of volumetric markings are configured to indicate relatively large volumes such as increments or fractions of 1 cup. Thus, for example, the first set of volumetric markings may range between ⅛ of 1 cup and 1 cup in one version of the invention, or between one quarter of 1 cup and 2 cups in another version of the invention.

Most preferably, a smallest unit of measure defines the volume within the container between the floor 30 and the smallest volumetric marking 25, as shown in FIG. 4. In one version of the invention, the smallest marking defines a volume which is larger than the largest volume indicated by the second set of markings, as described below.

As best seen in FIG. 5, a second set of volumetric markings 32 is provided on the floor 30 of the container. The second set of volumetric markings is configured to indicate volumes within the measuring cup in a space between the floor of the measuring cup and a portion of the surrounding sidewalls of the measuring cup. Thus, all or nearly all of the markings within the second set of volumetric markings will correspond to a volume of liquid in which the liquid does not entirely cover the floor of the container. The second set of volumetric markings therefore define volumes in which the lowest point of the volume is positioned at the lowest point 34 of the floor, and the highest point of the volume 33 is positioned at an intermediate location along the inclined floor between the lowest point 34 of the floor and the highest point 35 of the floor. In addition, in a preferred version the volume indicated by the largest volumetric marking 33 positioned on the floor 30 is smaller than the volume indicated by the smallest volumetric marking 25 positioned on the sidewall.

In the version as illustrated in FIGS. 1-5, the floor 30 of the measuring cup 10 is generally triangular in shape, with an apex of the triangle being located at the lowest position 34 on the floor. This narrowing of the floor at the bottom of the inclined floor further enables the floor to be used to define small volumes.

The principles of the present invention are best suited for measuring cups configured as short wide cylinders or other similarly shaped containers. In an alternate version as illustrated in FIGS. 6-8, the measuring cup is generally cylindrical, rather than having the generally triangular base as shown in the version of FIGS. 1-5. Thus, the alternate illustrated version of the measuring cup has an upper rim having a diameter D1, as shown in FIG. 7. Though characterized as a "diameter," it should be understood in this context to apply to a widest distance across opposing sides of the measuring cup, even if the rim does not define a circular shape. The measuring cup also includes a lower floor diameter D2, as shown in FIG. 8, which as indicated extends across a widest horizontal distance between the lowest part of the floor and the opposing highest point on the inclined floor. The measuring cup further has a height H between the lowest part of the floor and the top of the rim.

Most preferably, the height H of the measuring cup is less than twice the lower diameter D2, and more preferably the height H is less than 1.5 times the lower diameter D2. In the preferred version the height H is between 1 and 1.2 times the lower diameter D2. In addition, in the preferred version the total internal volume is at least one cup and may be two cups or more. The relatively large lower diameter D2 with respect to the height H, together with the volume of one cup or more, enables the second set of volumetric markings to encompass a relatively wide range of measurements between a fraction of a teaspoon (for example, ¼ or ½ of a teaspoon) and a tablespoon or more (for example, 2 or 3 tablespoons).

It should further be understood that while the foregoing description is made with reference to volumes expressed in teaspoons, tablespoons, and cups, measurements in other units should be considered equivalent, such as volumes in ounces, liters, or milliliters.

In one version of the invention, the volumetric indicators in the first set of indicators do not overlap the second set of indicators. In other words, the largest volume indicated on the second set of indicators is less than or equal to the smallest volume indicated on the first set of indicators. In other versions, the first and second set of indicators may overlap somewhat, but preferably the degree of overlap is such that the smallest measurement 25 indicated in the first set of indicators 22 is larger than the middle volume 34 (see FIG. 5) in the range of volumes expressed in the second set of indicators 32. This relationship between the diameter, height, and range of volumes combines to form a container having two sets of volumetric markings for groupings of relatively large and relatively small volumes.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A measuring cup, comprising:
    a floor and a sidewall extending upward from the floor and terminating in a rim to define an interior space;
    the floor being inclined from a first end toward a second end;
    a first set of volumetric markings positioned on the sidewall and configured to indicate a volume of liquid contained within the interior space, at least one of the markings within the first set of volumetric markings corresponding to a volume above the second end of the floor; and
    a second set of volumetric markings positioned on the floor and configured to indicate a volume of liquid having a lowest point of the liquid at the first end of the floor and a highest point of the liquid at a location being at or below the second end of the floor.

2. The measuring cup of claim 1, wherein the second set of volumetric markings comprises a second largest volume indicator, a second smallest volume indicator, and an intermediate volume indicator mid-way between the second largest volume indicator and the second smallest volume indicator, and further wherein the first set of volumetric markings includes a first largest volume indicator and a first smallest volume indicator, the first smallest volume indicator being larger than the intermediate volume indicator.

3. The measuring cup of claim 2, wherein the first smallest volume indicator is greater than or equal to the second largest volume indicator.

4. The measuring cup of claim 3, wherein the first smallest volume indicator is greater than the second largest volume indicator.

5. The measuring cup of claim 2, further comprising a spout formed on the sidewall, the spout being positioned directly above the first end of the floor.

6. The measuring cup of claim 5, wherein the floor defines a surface that is triangular within the boundary of the sidewall, an apex of the floor being positioned at the first end of the floor.

7. The measuring cup of claim 5, wherein the floor is cylindrical within the boundary of the sidewall.

8. The measuring cup of claim 2, further comprising a height of the sidewall above the first end of the floor and a lower diameter of the floor between the first end of the floor and the second end of the floor, the height being less than 1.5 times the diameter.

9. A measuring cup, comprising:
    a floor and a sidewall extending upward from the floor to define an interior space, the sidewall terminating in a rim;
    the floor having a first end adjacent a first portion of the sidewall and a second end adjacent a diametrically opposite portion of the sidewall, the floor being inclined from a lowest point at the first end toward a relatively higher point at the second end;

a first set of volumetric markings positioned on the sidewall and configured to indicate a plurality of first volumes within the interior space, at least one of the markings within the first set of volumetric markings corresponding to a volume above the highest point of the floor; and a second set of volumetric markings positioned on the floor and configured to indicate a plurality of second volumes within the interior space, wherein each of the plurality of second volumes has a lowest point at the first end of the floor and a highest point at a location at or highest point of the floor.

10. The measuring cup of claim 9, further comprising a spout formed on the sidewall, the spout being positioned directly above the first end of the floor.

11. The measuring cup of claim 10, wherein the floor defines a surface that is triangular within the boundary of the sidewall, an apex of the triangular floor being positioned at the first end of the floor.

12. The measuring cup of claim 9, wherein the floor is cylindrical within the boundary of the sidewall.

13. The measuring cup of claim 9, wherein the second set of volumetric markings comprises a second largest volume indicator, a second smallest volume indicator, and an intermediate volume indicator mid-way between the second largest volume indicator and the second smallest volume indicator, and further wherein the first set of volumetric markings includes a first largest volume indicator and a first smallest volume indicator, the first smallest volume indicator being larger than the intermediate volume indicator.

14. The measuring cup of claim 10, wherein the first smallest volume indicator is greater than or equal to the second largest volume indicator.

15. The measuring cup of claim 11, wherein the first smallest volume indicator is greater than the second largest volume indicator.

* * * * *